Jan. 16, 1945. J. A. BOMBARDIER 2,367,456
VEHICLE SPRING SUSPENSION
Filed July 10, 1943 2 Sheets-Sheet 1
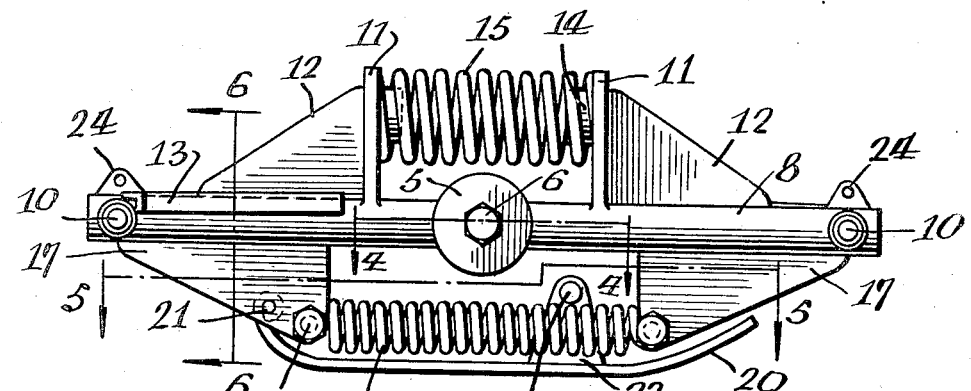
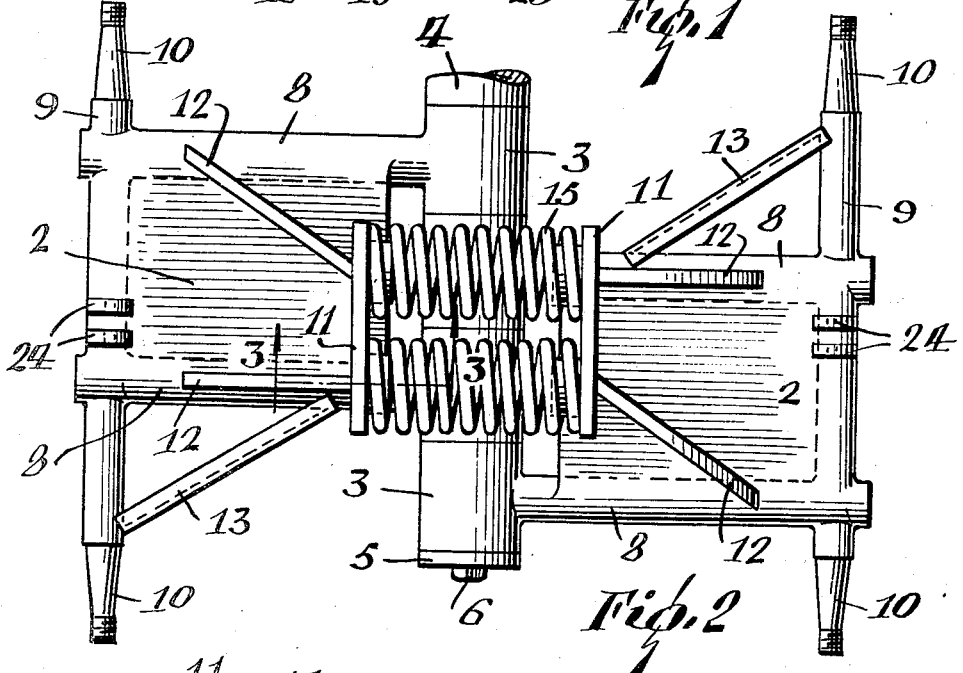
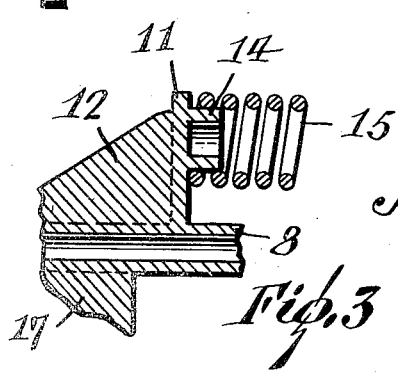
Inventor;
Joseph Armand Bombardier
By
Attorney Jan. 16, 1945. J. A. BOMBARDIER 2,367,456
VEHICLE SPRING SUSPENSION
Filed July 10, 1943  2 Sheets-Sheet 2
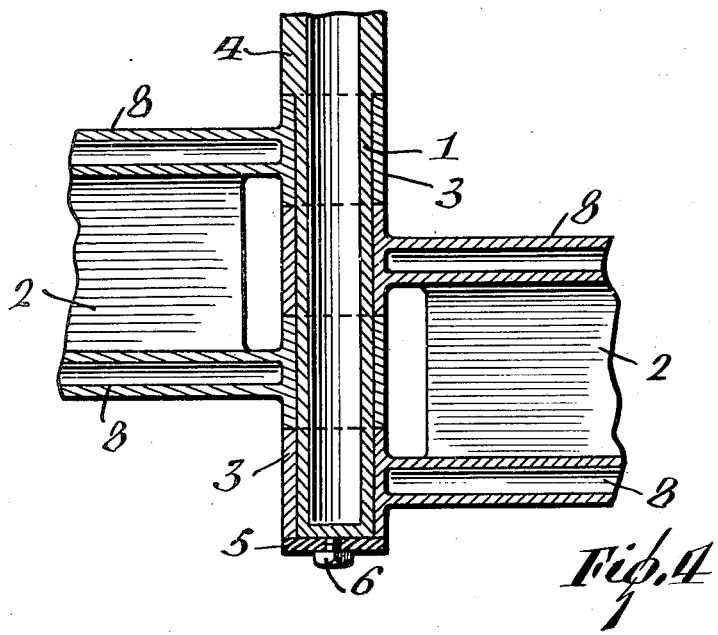
Fig. 4
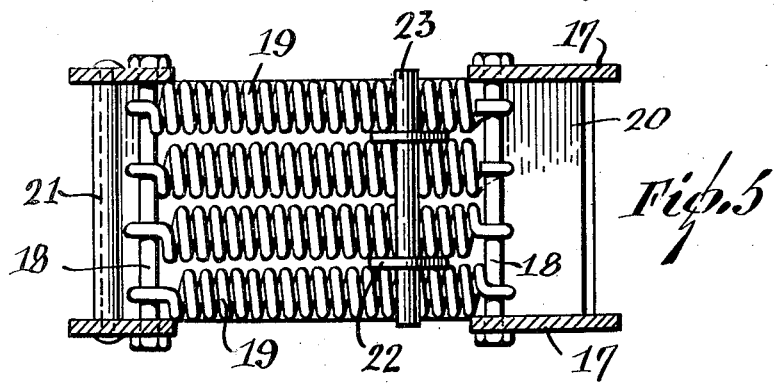
Fig. 5
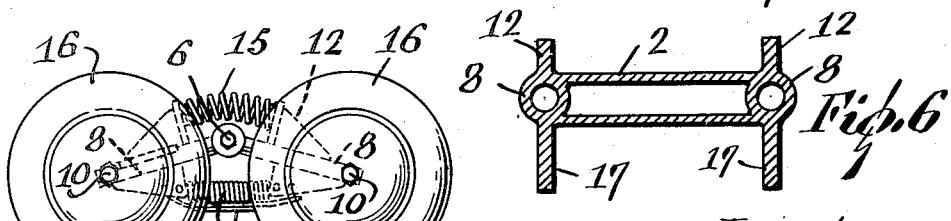
Fig. 6
Fig. 7
Inventor:
Joseph Armand Bombardier
By Albert Jourdain
Attorney Patented Jan. 16, 1945

2,367,456

UNITED STATES PATENT OFFICE 2,367,456

VEHICLE SPRING SUSPENSION

Joseph Armand Bombardier, Valcourt, Quebec, Canada

Application July 10, 1943, Serial No. 494,148

4 Claims. (Cl. 267—20)

The present invention pertains to a novel spring suspension for heavy vehicles such as trucks, combat vehicles and the like.

The principal object of the invention is to provide a simple, rugged and economical construction for resiliently supporting the load. In the accomplishment of this object, two axles are carried by two plates which, in turn, are hinged together on a transverse axis. The plates are joined by a heavy spring or springs at the upper surface and crossing the hinge axis. This spring structure is the principal cushion for the load, since the latter is supported at the hinge axis. Balancing springs in a similar position are supported at the lower surface.

Another object of the invention is to protect the lower spring structure from packing with snow and ice. Accordingly, a shield plate is laid beneath this structure, with one end hinged to one of the main plates. The body of the shield plate is supported by a shaft carried thereby and extending transversely over the lower spring structure.

The invention is fully disclosed by way of example in the following description and in the accompanying drawings, in which:

Figure 1 is a side elevation of the suspension;

Figure 2 is a plan view thereof;

Figure 3 is a section on the line 3—3 of Figure 2;

Figure 4 is a plan section on the line 4—4 of Figure 1;

Figure 5 is a section on the line 5—5 of Figure 1;

Figure 6 is a section on the line 6—6 of Figure 1, and

Figure 7 is a side elevation of the suspension on wheels.

Reference to these views will now be made by use of like characters which are employed to designate corresponding parts throughout.

In Figures 1 and 4 is shown a transverse shaft 1 adapted to lie transversely of the vehicle and between a pair of alined wheels, as will presently be shown. Plates 2 extend horizontally to opposite sides of the shaft 1, to which they are rotatably attached by surrounding bosses 3. At one end the shaft may be enlarged at 4 to the outside diameter of the bosses, while the boss at the other end may be plugged by a disk 5 fastened by a bolt 6.

Each plate 2 has a tube 8 formed with or welded to both longitudinal edges and another tube or shaft 9 formed with or welded to the transverse edge more remote from the shaft 1. The shafts 9 are extended somewhat beyond the edges of the plates in order to support axles 10. The described construction consisting of tubes wherever feasible and plates welded thereto is preferred for lightness, strength and ease of fabrication.

Vertical transverse plates 11 are welded upon the plates 2 at opposite sides of the central shaft 1 for a purpose that will presently be described. The plates 11 are reinforced by triangular fins 12 welded thereto and to the plates 2. Similarly angle irons 13 may also extend from the tubes 8 to the corresponding extended shafts 9.

The opposed faces of each of the plates 11 are formed each with a pair of projecting spring retainers 14, and a heavy compressed coil spring 15 is mounted on each pair of opposed retainers. Figure 7 shows wheels 16 mounted on the axles. With no load on the shaft 1, or under road shock, the springs 15 expand and elevate the shaft. Under load the plates 2 and the springs assume a more nearly horizontal position, as represented in Figure 1. The springs 15 thus constitute the principal cushion for the load. The axles shown in Figure 2 are adapted for dual wheels, yet it will be apparent that a pair of alined single wheels may be similarly suspended by a lighter construction having shorter axles and one spring 15.

To the lower surface of each plate 2 are welded two parallel vertical webs 17 as shown in Figures 1 and 5. The webs of each web are respectively alined with those of the other web. Through each pair of opposed webs is passed a shaft 18, and the shafts are joined by a series of coil springs 19.

If the suspension is used for a snow vehicle, a plate 20 is slung beneath the springs 19 to prevent them from becoming packed with snow and ice. One end of the plate is hinged at 21 to a pair of opposed webs 17, while the other end is held by a pair of ears 22 supporting a transverse shaft 23 resting upon the springs 19. This shaft may be of heavy rubber or rubber covered to avoid clashing and rattling against the springs 19. These springs obviously balance the springs 15 in the action of the device.

The outer edges of the plates 2 carry spaced ears 24 for coupling two or more suspension units as, for example, on a heavy vehicle or an endless track vehicle. The wheels on the axles may ride directly on the ground or may be the bogie wheel of a track laying vehicle as shown in my copending application Serial No. 494,147, filed July 10, 1943, now Patent No. 2,355,266, issued August 8, 1944.

Although a specific embodiment of the invention has been illustrated and described, it will be understood that various alterations in the details of construction may be made without departing from the scope of the invention as indicated by the appended claims.

What I claim as my invention is:

1. In a vehicle suspension, a transverse shaft, a pair of plates hinged thereon and extending horizontally in opposite directions therefrom, a spring retaining member fixed on each of said plates, said members facing each other, a compressed spring between said members, a depending structure from the lower surface of each of said plates, spring means connecting said structures, a plate disposed beneath said spring means and supported from said structure, and means on each of said pair of plates for supporting an axle parallel to said shaft.

2. In a vehicle suspension, a transverse shaft, a pair of plates hinged thereon and extending horizontally in opposite directions therefrom, a spring retaining member fixed on each of said plates, said members facing each other, a compressed spring between said members, a depending structure from the lower surface of each of said plates, spring means connecting said structures, a plate disposed beneath said spring means and supported from said structure, another shaft carried by the last named plate and lying transversely over said spring means, and means on each of said pair of plates for supporting an axle parallel to said shaft.

3. In a vehicle suspension, a transverse shaft, a pair of plates hinged thereon and extending horizontally in opposite directions therefrom, a spring retaining member fixed on each of said plates, said members facing each other, a compressed spring between said members, a web depending from each of said plates, spring means joining said webs, a plate extending beneath said spring means and having one end pivotally attached to one of said webs, a shaft carried by the last named plate and lying transversely over said spring means, and means on each of said pair of plates for supporting an axle parallel to said shaft.

4. In a vehicle suspension, a transverse shaft, a pair of plates hinged thereon and extending horizontally in opposite directions therefrom, a spring retaining member fixed on each of said plates, said members facing each other, a compressed spring between said members, means on each of said pair of plates for supporting an axle parallel to said shaft, and attaching means at the outer edge of each of said plates, for connecting sets of joined plates in series.

JOSEPH ARMAND BOMBARDIER.